(12) United States Patent
Huang

(10) Patent No.: US 8,252,443 B2
(45) Date of Patent: Aug. 28, 2012

(54) BATTERY COVER LATCH MECHANISM AND PORTABLE ELECTRONIC DEVICE USING SAME

(75) Inventor: Mao-Zhao Huang, Shenzhen (CN)

(73) Assignees: Shenzhen Futaihong Precision Industry Co., Ltd., ShenZhen, Guangdong Province (CN); FIH (Hong Kong), Kowloon (HK)

( * ) Notice: Subject to any disclaimer, the term of this patent is extended or adjusted under 35 U.S.C. 154(b) by 470 days.

(21) Appl. No.: 12/548,013

(22) Filed: Aug. 26, 2009

(65) Prior Publication Data
US 2010/0143778 A1 Jun. 10, 2010

(30) Foreign Application Priority Data
Dec. 4, 2008 (CN) .......................... 2008 1 0305957

(51) Int. Cl.
*H01M 2/10* (2006.01)
(52) U.S. Cl. ......................................... 429/97; 429/100
(58) Field of Classification Search .................. 429/100, 429/97
See application file for complete search history.

(56) References Cited

U.S. PATENT DOCUMENTS
2005/0084747 A1* 4/2005 Allen et al. ...................... 429/97
2007/0218961 A1* 9/2007 Luo et al. .................... 455/575.1
* cited by examiner

*Primary Examiner* — Ula C Ruddock
*Assistant Examiner* — Patricia Davis
(74) *Attorney, Agent, or Firm* — Altis Law Group, Inc.

(57) ABSTRACT

A battery cover latch mechanism used to releasably latching a battery cover to a housing, the battery cover latch mechanism includes a clasp positioned on the battery cover; and a button. The button includes a resilient member, a main portion positioned on a middle of the resilient member, and two blocks respectively formed on two ends of the resilient member. The main portion and the resilient member are slidably assembled on the housing, the blocks resists the battery cover, the main portion latching to the clasp. When the main portion is pressed, the main portion is detached from the clasp, the resilient member drives the blocks pushing the battery to open the battery cover relative to the housing. The invention also discloses a portable electronic device using the battery cover latch mechanism.

18 Claims, 7 Drawing Sheets

BATTERY COVER LATCH MECHANISM AND PORTABLE ELECTRONIC DEVICE USING SAME

BACKGROUND

1. Technical Field

The present disclosure relates to battery cover latch mechanisms used in portable electronic devices.

2. Description of Related Art

Portable electronic devices such as mobile phones and personal digital assistants (PDA) are widely used. Batteries are installed in most portable electronic devices to supply electric power. When a battery is installed in a portable electronic device, it is generally shielded and fixed in place by a battery cover latch mechanism, thus the battery and the inner circuits of the portable electronic device are well protected.

A conventional battery cover latch mechanism generally includes a cover and a housing. The cover tightly engages with the housing to be secured thereon. However, due to the tight engagement of the cover and the housing in many conventional designs, a significant amount of impact and friction exist between the cover and the housing. As a result, the user may need to apply a significant amount of strength to assemble/disassemble the cover to/from the housing. Further, the cover and the housing may be distorted or even damaged by impact or friction between each other in the assembly/disassembly operation.

Therefore, there is a room for improvement within the art.

BRIEF DESCRIPTION OF THE DRAWINGS

Many aspects of a battery cover latch mechanism and portable electronic device using the battery cover latch mechanism can be better understood with reference to the following drawings. The components in the drawings are not necessarily to scale, the emphasis instead being placed upon clearly illustrating the principles of the present battery cover latch mechanism and portable electronic device using the battery cover latch mechanism. Moreover, in the drawings, like reference numerals designate corresponding parts throughout the several views.

DETAILED DESCRIPTION OF THE EMBODIMENTS

Figure 1:
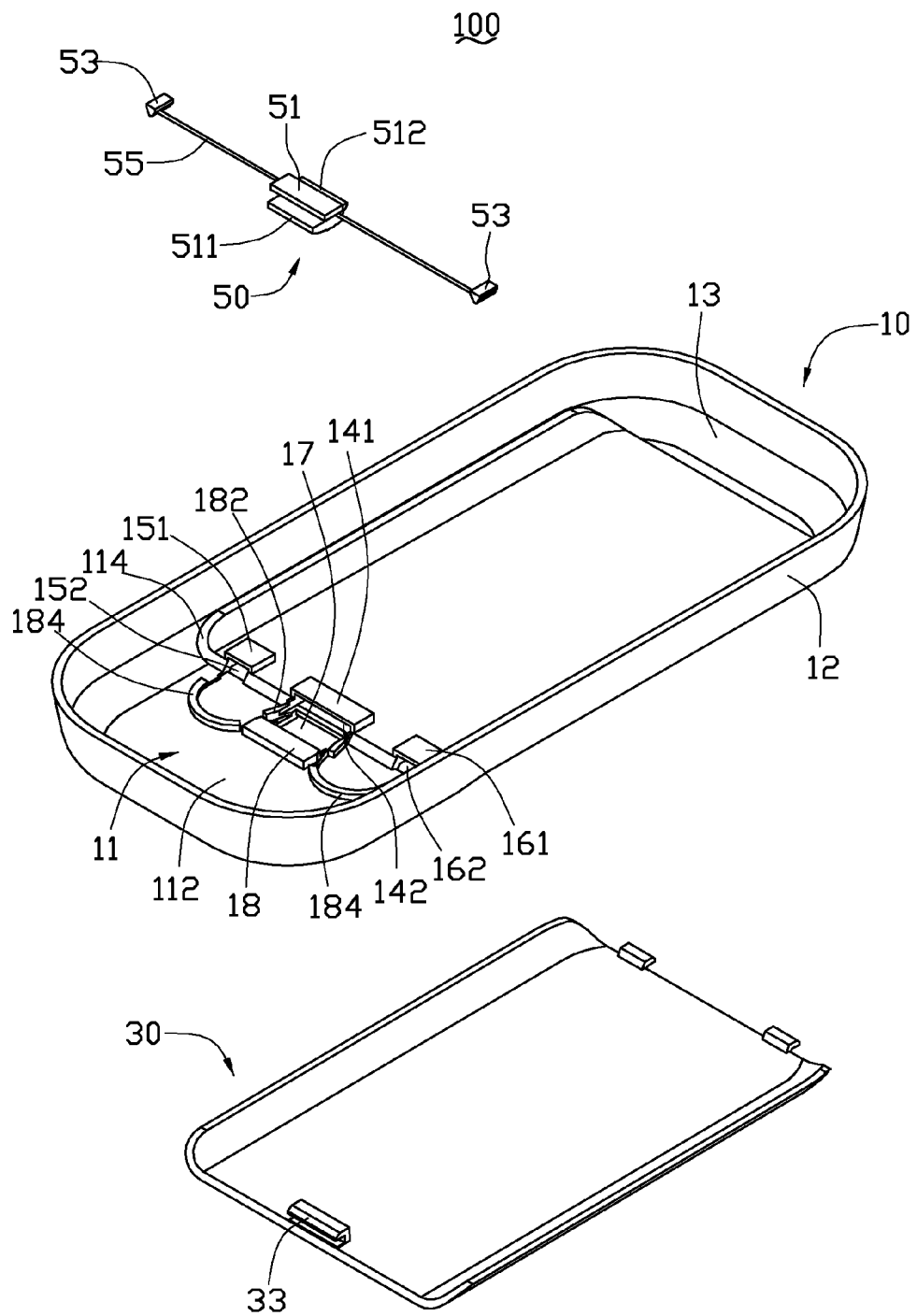
FIG. 1 is an exploded perspective view of a portable electronic device using a battery cover latch mechanism according to an exemplary embodiment.
Figure 2:
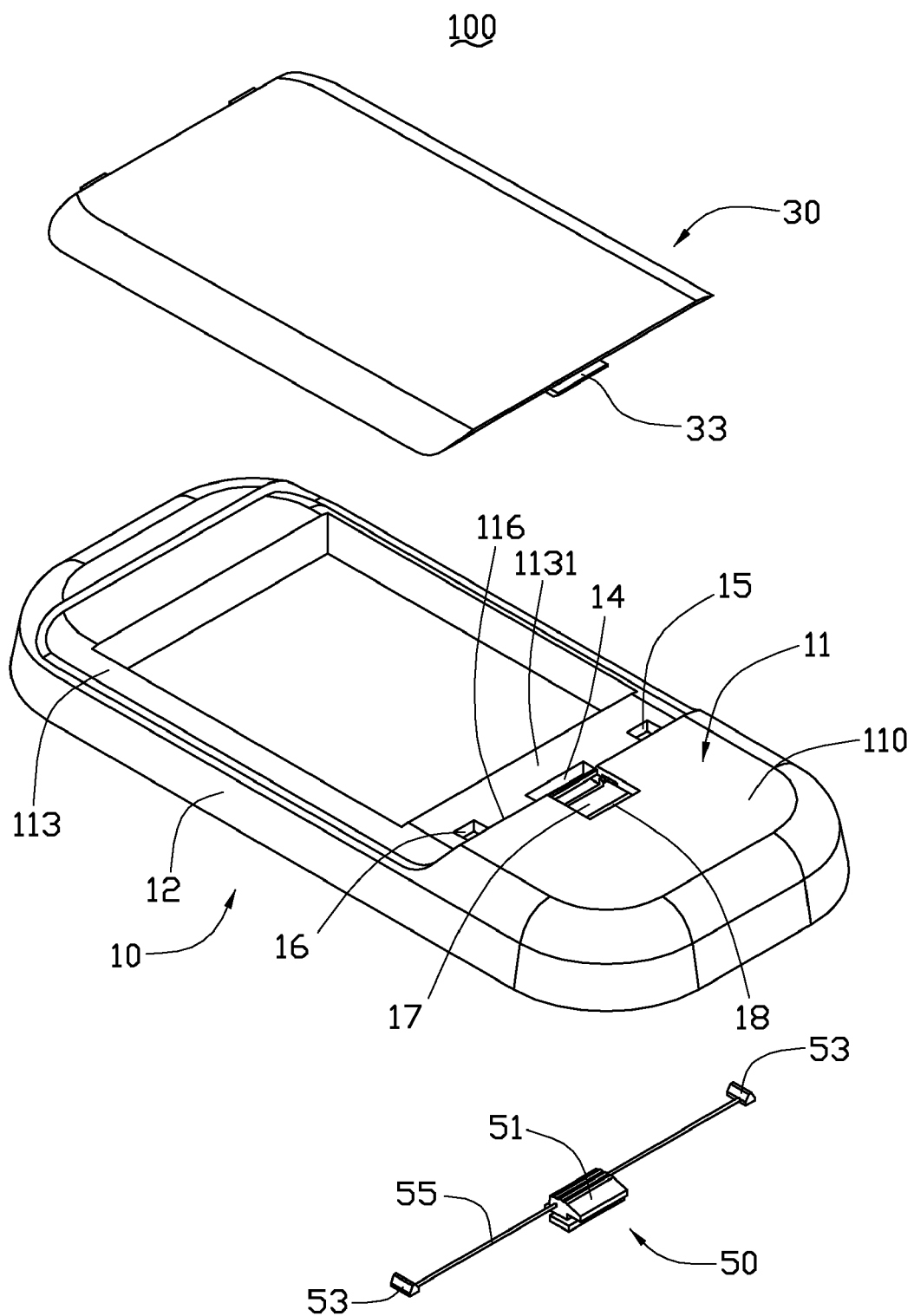
FIG. 2 is similar to FIG. 1, but viewed from anther angle.

FIG. 1 and FIG. 2 show a battery cover latch mechanism 100 applied in a portable electronic device. The battery cover latch mechanism 100 includes a housing 10, a battery cover 30 matching with the housing 10, and a latching portion 50 assembled on the housing 10.

The housing 10 can be a part of the portable electronic device. The housing 10 includes a bottom wall 11 and a peripheral wall 12 perpendicularly bent from the bottom wall 11. The bottom wall 11 and the peripheral wall 12 cooperatively define a receiving portion 13. The bottom wall 11 includes a front portion 110 and an opposite back portion 112. The front portion 110 defines a recessed portion 113 including a bottom portion 1131. The bottom portion 1131 defines a first hole 14, a second hole 15, and a third hole 16 spaced from each other. The second hole 15 and the third hole 16 are symmetrically defined at two sides of the first hole 14. Accordingly, a first carrying portion 141, a second carrying portion 151, and a third carrying portion 161 are positioned on the back portion 112, and respectively align with the first hole 14, a second hole 15, and a third hole 16. The first carrying portion 141, the second carrying portion 151, and the third carrying portion 161 respectively define a first opening 142, a second opening 152, and a third opening 162. The bottom wall 11 defines a through hole 17 adjacent to the first hole 14.

The back portion 112 includes a supporting portion 18, two guiding rails 184 positioned thereon, and two baffle plates 182. The supporting portion 18 is positioned on the bottom wall 11 and aligns with the first carrying portion 141. The supporting portion 18 is partially exposed from the through hole 17. The guiding rails 184 are arcuate and symmetrically positioned at two sides of the supporting portion 18, and configured for receiving the latching portion 50. The baffle plates 182 are symmetrically positioned at two sides of the through hole 17 adjacent to the supporting portion 18.

The battery cover 30 includes a clasp 33 positioned on a free end thereof. The clasp 33 is configured for receiving the first carrying portion 141 and latching to the latching portion 50.

The latching portion 50 includes a main portion 51, two blocks 53, and a resilient member 55. The main portion 51 includes a jaw 511 and a latching plate 512. The jaw 511 extends from one side of the main portion 51, and configured for latching to the supporting portion 18. The latching plate 512 is located on an opposite side of the main portion 51 to the jaw 511 and configured for latching to the clasp 33. The resilient member 55 is a wire made of spring steel. The main portion 51 is formed on a middle of the resilient member 55. Thus, the resilient member 55 can be divided into two parts, each of two parts can be received in the corresponding guiding rails 184. The blocks 53 are respectively fixed on two ends of the resilient member 55. The main portion 51 and the blocks 53 are integrally formed with the resilient member 55 by insert molding.

Figure 3:
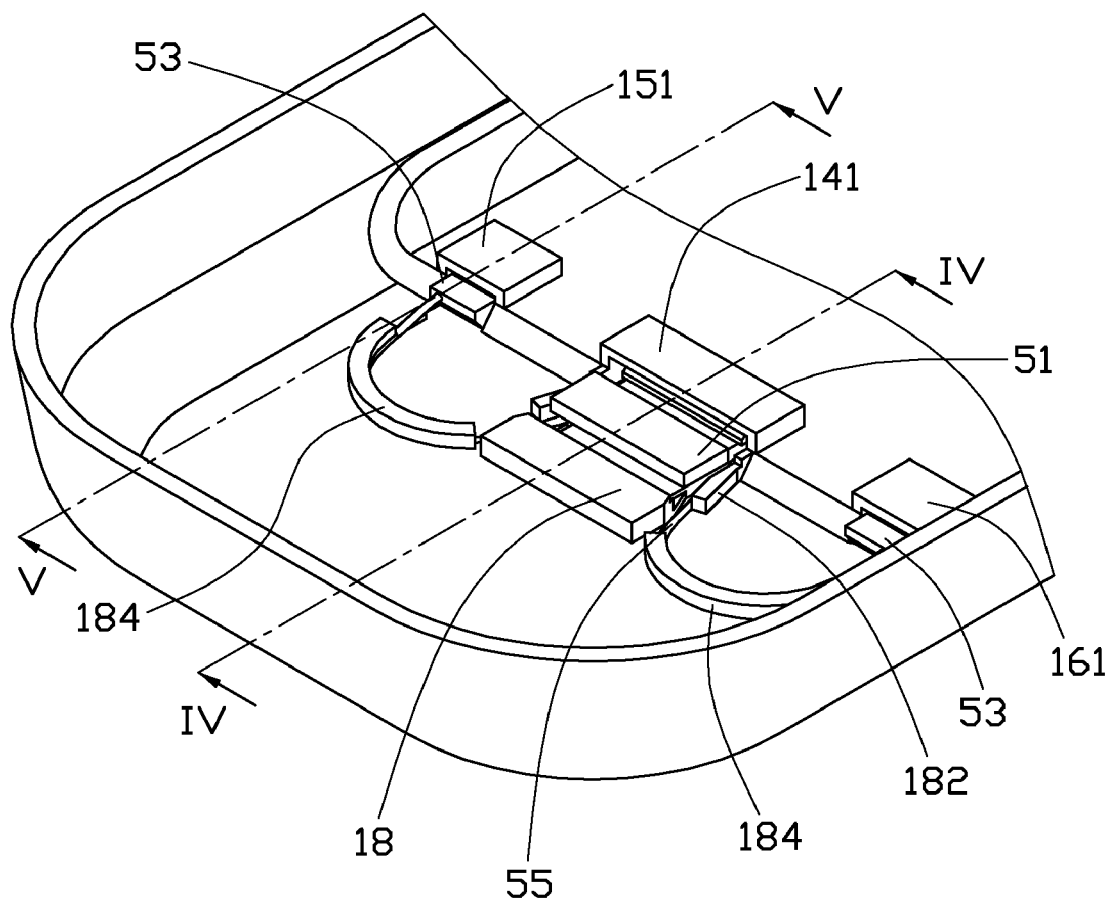
FIG. 3 is a partially assembled view of the battery cover latch mechanism.
Figure 4:
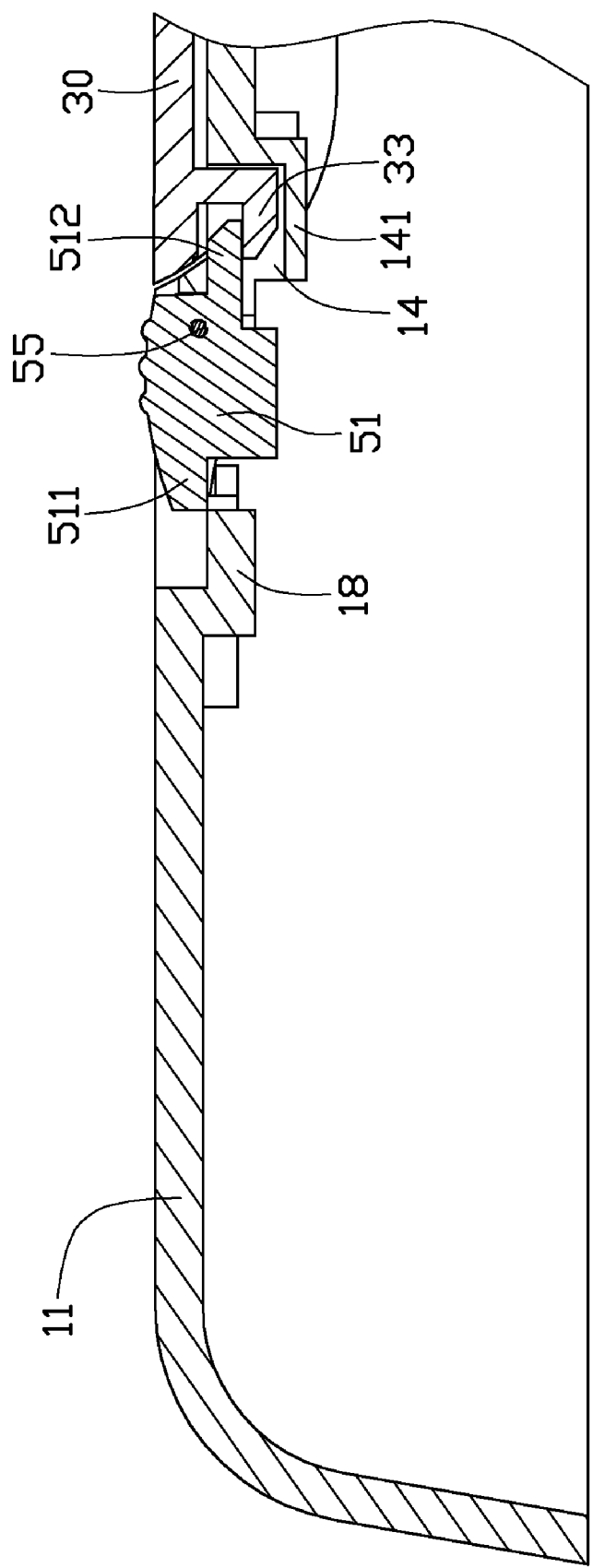
FIG. 4 is a cross-sectional view taken along line IV-IV of FIG. 3, showing the battery cover latch mechanism in locking state.

Referring to FIG. 3 and FIG. 4, in assembly, the main portion 51 passes through the through hole 17 and resists the supporting portion 18. The resilient member 55 is received in the guiding rails 184. The blocks 53 are respectively received in the second carrying portion 151 and the third carrying portion 161.

Figure 5:
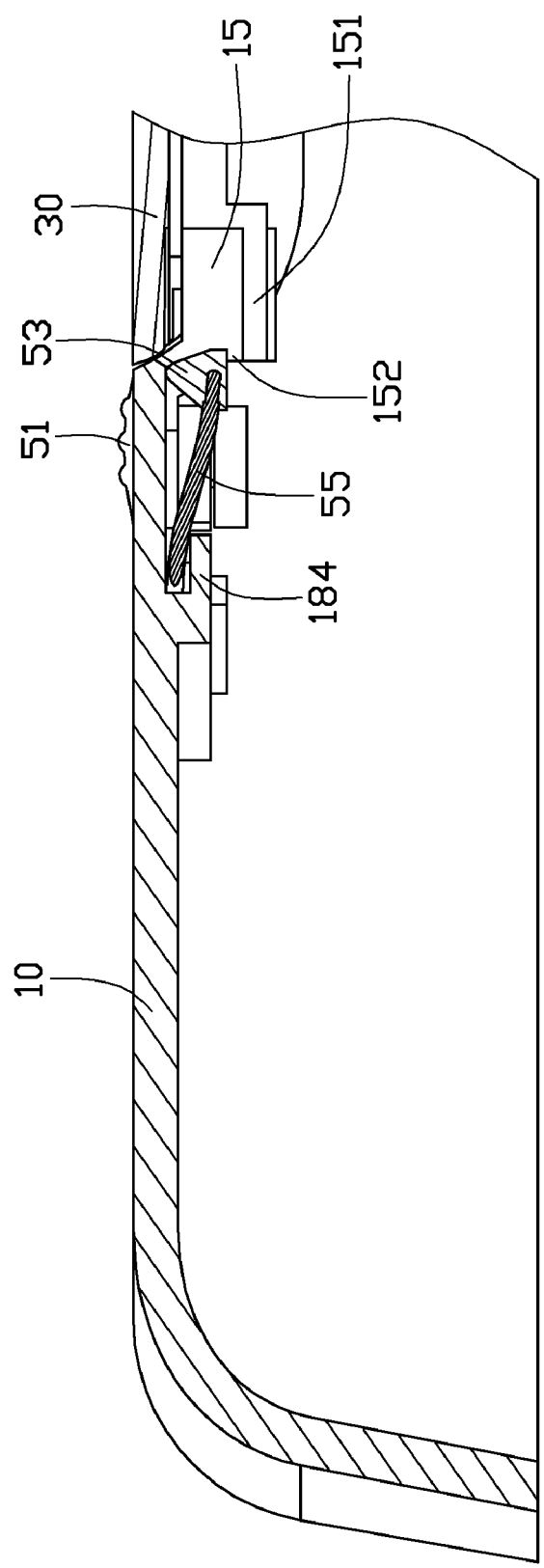
FIG. 5 is a cross-sectional view taken along line V-V of FIG. 3, showing the battery cover latch mechanism in locking state.

Referring to FIG. 2, FIG. 4, and FIG. 5, when the battery cover 30 is assembled on the housing 10, the main portion 51 is pushed towards the first carrying portion 141 by an external force. The resilient member 55 generates an elastic force and moves in the guiding rails 184. The resilient member 55 pushes the blocks 53 out of the second opening 152 and the third opening 162. The battery cover 30 is downwardly pressed. The clasp 33 is received in the first carrying portion 141. When the external force is removed, the main portion 51 moves towards the first carrying portion 141 by the elastic force of the resilient member 55. The latching plate 512 latches to the clasp 33. As such, the battery cover 30 is assembled on the housing 10.

Figure 6:
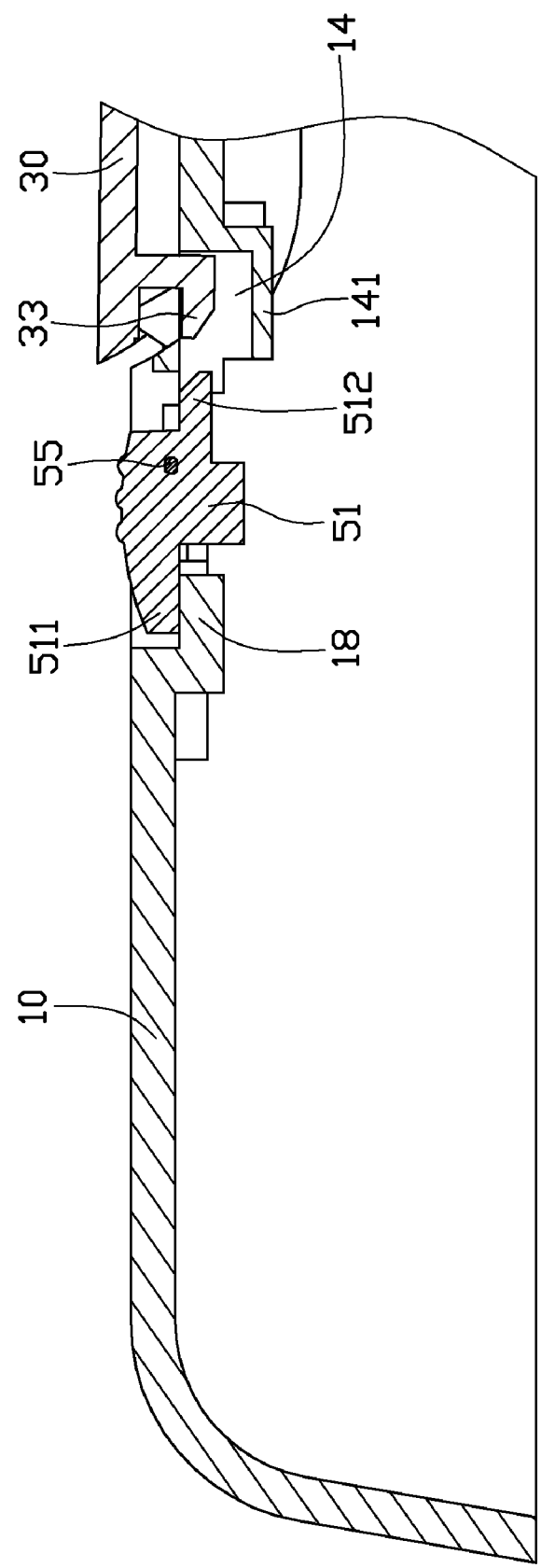
FIG. 6 is a cross-sectional view taken along line IV-IV of FIG. 5, showing the battery cover latch mechanism in locking state.
Figure 7:
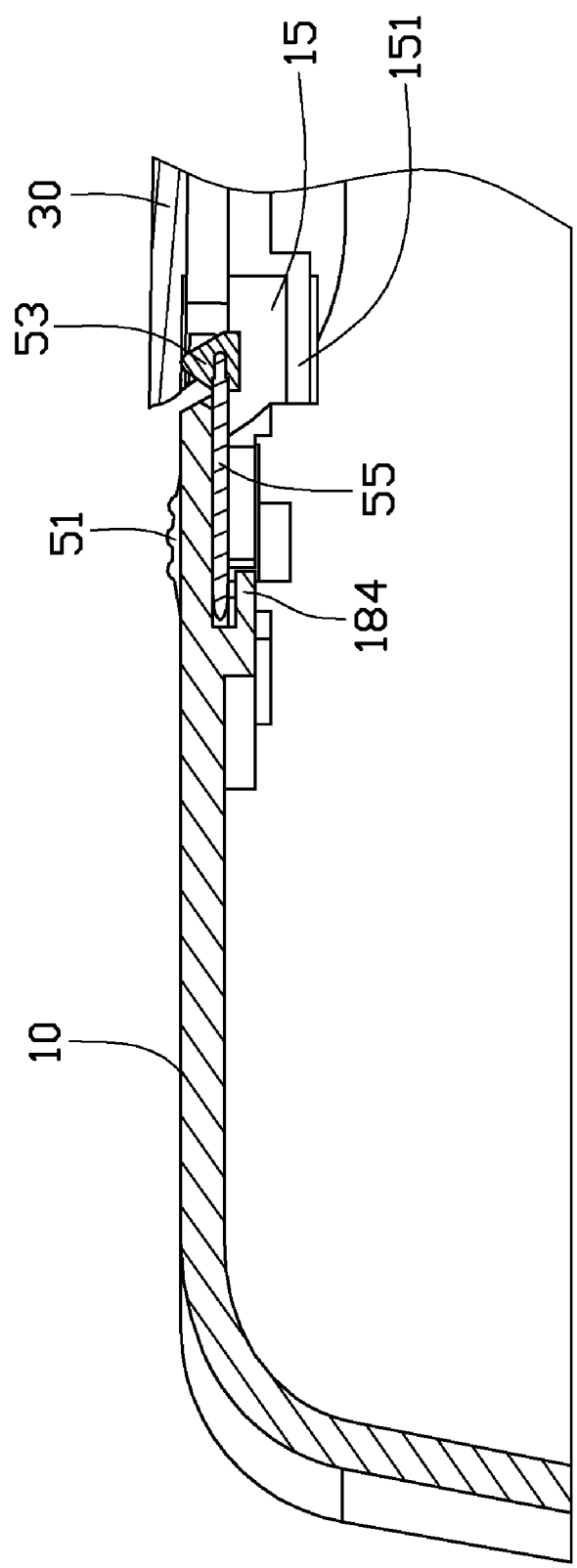
FIG. 7 is a cross-sectional view taken along line V-V of FIG. 5, showing the battery cover latch mechanism in unlocking state.

Referring to the drawings FIG. 2, FIG. 6, and FIG. 7, when disassembling the battery cover 30 from the housing 10, the main portion 51 is pushed by an external force. The clasp 33 is then detached from the latching plate 512. Meanwhile, the main portion 51 drives the resilient member 55 to move in the corresponding guiding rails 184. The resilient member 55 pushes the blocks 53 out of the second hole 152 and the third hole 162. The blocks 53 push the battery cover 30 away from the bottom portion 1131, and the battery cover 30 is detached from the housing 10.

It is to be understood, that the baffle plates 182 can be omitted, the resilient member 55 is directly received in the guiding rails 184.

It is to be understood, that the guiding rails 184 is a pipe, the resilient member 55 is received in the guiding rails 184.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism used to releasably latching a battery cover to a housing, the battery cover latch mechanism, comprising:
    a clasp positioned on the battery cover; and
    a latching mechanism comprising:
        a resilient member;
        a main portion positioned on a middle of the resilient member; and
        two blocks respectively formed on two ends of the resilient member, the main portion, the two blocks and the resilient member being arranged along a line;
    wherein the main portion is slidably assembled on the housing, the resilient member is bent to be assembled on the housing, the blocks resists the battery cover, the main portion latching to the clasp, when the main portion is pushed, the main portion is detached from the clasp and move the resilient member, the resilient member moves the blocks pushing the battery cover to open the battery cover relative to the housing.

2. The battery cover latch mechanism as claimed in claim 1, wherein the housing comprises a supporting portion, a through hole adjacent to the supporting portion, and two arcuate guiding rails positioned adjacent to the supporting portion, the resilient member is slidably received the guiding rails, the main portion passes through the through hole and resists the supporting portion.

3. The battery cover latch mechanism as claimed in claim 2, wherein the guiding rails are pipes, the resilient member is a wire, and is bent and received in the guiding rails.

4. The battery cover latch mechanism as claimed in claim 2, wherein the housing further comprises a first carrying portion aligning with the supporting portion, the clasp is received in the first carrying portion, the main portion latches to the clasp.

5. The battery cover latch mechanism as claimed in claim 4, wherein the housing further comprises a second carrying portion and a third carrying portion symmetrically defined at two sides of the first carrying portion, the blocks are respectively received in the second carrying portion and the third carrying portion.

6. The battery cover latch mechanism as claimed in claim 1, wherein the main portion and the blocks are integrally formed with the resilient member by insert molding.

7. The battery cover latch mechanism as claimed in claim 1, wherein the resilient member is made of spring steel.

8. A portable electronic device, comprising:
    a housing including two arcuate guiding rails;
    a battery cover comprising a clasp positioned thereon;
    a battery cover latch mechanism comprising:
        a resilient member being a line wire deformedly and slidably received in the guiding rails;
        a main portion positioned on the resilient member; and
        two blocks respectively formed on two ends of the resilient member, and resisting the housing;
    wherein the main portion is slidably assembled on the housing, the main portion and the resilient member are together moved to release the blocks from resisting the housing to detach the battery cover from the housing.

9. The portable electronic device as claimed in claim 8, wherein the housing comprises a supporting portion, and a through hole adjacent to the supporting portion, the main portion passes through the through hole and resists the supporting portion.

10. The portable electronic device as claimed in claim 8, wherein the guiding rails are pipes, the resilient member is received in the guiding rails.

11. The portable electronic device as claimed in claim 8, wherein the housing further comprises a first carrying portion aligning with the supporting portion, the clasp is received in the first carrying portion, the main portion latches to the clasp.

12. The portable electronic device as claimed in claim 11, wherein the housing further comprises a second carrying portion and a third carrying portion symmetrically defined at two sides of the first carrying portion, the blocks are respectively received in the second carrying portion and the third carrying portion.

13. The portable electronic device as claimed in claim 8, wherein the main portion and the blocks are integrally formed with the resilient member by insert molding.

14. The portable electronic device as claimed in claim 8, wherein the resilient member is made of spring steel.

15. The battery cover latch mechanism as claimed in claim 1, wherein the housing includes a bottom portion, the bottom portion defines a first hole, a second hole, and a third hole spaced from each other, the second hole and the third hole are symmetrically defined at two sides of the first hole, a first carrying portion, a second carrying portion, and a third carrying portion are positioned on an opposite side of the bottom portion, and respectively align with the first hole, a second hole, and a third hole, the clasp is received in the first carrying portion, the main portion latches to the clasp, the blocks are respectively received in the second carrying portion and the third carrying portion.

16. The battery cover latch mechanism as claimed in claim 15, wherein the housing comprises a supporting portion, and a through hole adjacent to the supporting portion, the supporting portion aligns with the first carrying portion, the main portion passes through the through hole and resists the supporting portion.

17. The battery cover latch mechanism as claimed in claim 16, wherein two arcuate guiding rails are positioned adjacent to the supporting portion, the resilient member is slidably received the guiding rails.

18. The battery cover latch mechanism as claimed in claim 16, wherein two baffle plates are symmetrically positioned at two sides of the through hole adjacent to the supporting portion.

* * * * *